United States Patent
Ohno

(10) Patent No.: US 8,077,211 B2
(45) Date of Patent: Dec. 13, 2011

(54) IMAGE BLURRING CORRECTION DEVICE AND IMAGING DEVICE USING THE SAME WITH A HIGH PASS FILTER

(75) Inventor: Takehide Ohno, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 584 days.

(21) Appl. No.: 12/230,069

(22) Filed: Aug. 22, 2008

(65) Prior Publication Data

US 2009/0086040 A1    Apr. 2, 2009

(30) Foreign Application Priority Data

Aug. 24, 2007 (JP) ................................ 2007-217763
Jan. 18, 2008 (JP) ................................ 2008-009357

(51) Int. Cl.
  *H04N 5/228* (2006.01)
(52) U.S. Cl. .................................. 348/208.7; 348/208.2
(58) Field of Classification Search ............ 348/208.99, 348/208.2, 208.1, 208.3, 208.4, 208.7
See application file for complete search history.

(56) References Cited

U.S. PATENT DOCUMENTS

| | | | |
|---|---|---|---|
| 7,209,165 B2 * | 4/2007 | Ishikawa | 348/208.99 |
| 7,355,631 B2 * | 4/2008 | Kumaki | 348/208.99 |
| 7,546,027 B2 * | 6/2009 | Moriya | 396/55 |
| 2004/0189815 A1 * | 9/2004 | Kumaki | 348/208.99 |
| 2007/0154195 A1 | 7/2007 | Irisawa et al. | |

FOREIGN PATENT DOCUMENTS

| | | |
|---|---|---|
| JP | 2004-215189 | 7/2004 |
| JP | 4058283 | 12/2007 |

* cited by examiner

*Primary Examiner* — Nicholas Giles
(74) *Attorney, Agent, or Firm* — Dickstein Shapiro LLP

(57) ABSTRACT

An imaging device includes an angular velocity sensor (11), which outputs a blurring signal, a high-pass filter circuit unit (12), which eliminates a direct current component in accordance with a first time constant, and which outputs a fluctuation portion with respect to a reference voltage as an angular velocity signal, an analog switch ASW (1), which cause a charge that is accumulated within the high-pass filter circuit unit (12) to discharge according to a second time constant, a computation unit (15), which is for performing a computation in order to correct a blurring of an image in accordance with the angular velocity signal, and a detection circuit unit (15D), which, in order to detect a change over time of the angular velocity of the camera body, samples the angular velocity signal on a per fixed time interval basis, obtains a derivative in accordance with a value thus sampled of the angular velocity signal, and detects a change over time in a size of the derivative thus obtained, wherein the time constant of the high-pass filter is switched between the first time constant and the second time constant of the high-pass filter by controlling a switching on or off of the analog switch in accordance with the result of the detection that is performed by the detection circuit unit (15D).

13 Claims, 10 Drawing Sheets

IMAGE BLURRING CORRECTION DEVICE AND IMAGING DEVICE USING THE SAME WITH A HIGH PASS FILTER

CROSS-REFERENCE TO THE RELATED APPLICATIONS

This application is based on and claims priority from each of Japanese Patent Application No. 2007-217763, filed on Aug. 24, 2007 and Japanese Patent Application No. 2008-009357, filed on Jan. 18, 2008, the disclosure of which is incorporated herein by reference in its entirety.

BACKGROUND OF THE INVENTION

1. Field of the Invention

The present invention relates to an improvement in an imaging device and an image blurring correction device, each of which employs an angular velocity sensor and a high-pass filter configured to perform a detection of an angular velocity that is caused by a movement of a shaking hand of the imaging device and correct the image blurring that may result therefrom.

2. Description of the Related Art

An imaging device that includes an image blurring correction device, which corrects a blurring of an image, is conventionally known. The image blurring correction device employs an angular velocity sensor and a high-pass filter to perform a detection of an angular velocity in accordance with a movement of a shaking hand (for reference, see Japanese Patent Application Publication No. 2004-215189). The angular velocity sensor detects a blurring that results from a vibration of a camera, and outputs a blurring signal.

The high-pass filter, which is configured from a capacitor and a resistor, is employed to eliminate an offset, i.e., a direct current component, of the blurring signal that arises from such as a drift or the like on the part of the angular velocity sensor. The blurring signal that results after being passed through the high-pass filter, i.e., an alternating current that gives rise to the blurring, is employed as an angular velocity signal. The correction of the blurring of the image is performed in accordance with the angular velocity signal that results therefrom.

On the other hand, a frequency of the blurring signal that arises from the movement of the shaking hand is typically on the order of between about 1 Hz and 20 Hz. Accordingly, a cut-off frequency of the high-pass filter must be less than 1 Hz to a degree sufficient to allow the image blurring that arises from the movement of the shaking hand to be reliably corrected. The cut-off frequency of the high-pass filter is thus set to a value on the order 0.1 Hz.

Accordingly, a time constant of the high-pass filter is on the order of $\tau=1/(2\pi\times0.1)=1.6$ seconds. Setting such a time constant, however, necessitates on the order of $6\times\tau$=approximately 10 seconds in order for the angular velocity signal to be normalized when a significant fluctuation occurs with the angular velocity signal thereof.

Accordingly, when panning while taking a photograph, i.e., moving a camera body 1 from left to right, or vice versa, such as is illustrated in FIG. 1, as an instance thereof, a phenomenon occurs in accordance with a change in a direction of the camera 1, such as is described hereinafter.

In FIG. 1, reference numeral A1 denotes a rotational driving operation commencement period, which is for rapidly orienting the camera body 1, which is in a static state, toward a subject of a photograph, reference numeral A2 denotes a rotational driving photography period, wherein the camera body 1 is moved in a rotational driving manner at a given angular velocity in order to take a pan photograph, reference numeral A3 denotes a rotation operation termination period, wherein the rotational driving of the camera body 1 is halted after the taking of the pan photograph is completed, and reference numeral A4 denotes a static state period, wherein the camera body 1 is maintained in a static state, following the halting of the rotational driving of the camera body 1.

A transition curve Q of an actual angular velocity, i.e., a true angular velocity, of the camera body 1 when taking the pan photograph is denoted by a solid line in FIG. 2, and a transition curve Q of the angular velocity signal of the camera body 1 when taking the pan photograph is shown by a dashed line in FIG. 2. A horizontal axis denotes units of time, and a vertical axis denotes a scale value that corresponds to either the angular velocity or a voltage.

In the rotational driving operation commencement period A1, the actual angular velocity of the camera body 1 is increased from zero, such as is denoted by reference numeral Q1, as a result of the rapid rotational driving operation of the camera body 1. In the rotational driving photography period A2, the actual angular velocity of the camera body 1 reaches a constant value, such as is denoted by reference numeral Q2. In the rotation operation termination period A3, the actual angular velocity of the camera body 1 declines such as is denoted by reference numeral Q3, owing to the halting of the rotational driving of the camera body 1. In the static state period A4, the actual angular velocity of the camera body 1 reaches zero, such as is denoted by reference numeral Q4.

When performing a tilt photograph, by tilting the camera body 1 in order to orient the camera body 1 toward the subject of the photograph, it is to be understood that the transition of the angular velocity of the camera body 1 thereupon denotes a transition that is similar to the transition of the actual angular velocity of the camera body 1 when taking the pan photograph.

On the contrary, in the rotational driving operation commencement period A1, the camera body 1 is accelerated from the static state so as to be rotationally driven in a constant direction, the capacitor in the high-pass filter is charged, and an angular velocity signal Q' that is outputted by the angular velocity sensor increases such as is denoted by reference numeral Q1'. In the rotational driving photography period A2, the angular velocity signal Q' declines such as is denoted by reference numeral Q2' in order to discharge the charge that is accumulated in the capacitor in the high-pass filter according to the time constant of the high-pass filter. In the rotation operation termination period A3, the angular velocity Q of the camera body 1 is decelerated, i.e., the camera body 1 is accelerated in an opposite direction, whereupon the charge in the capacitor in the high-pass filter is rapidly discharged, the angular velocity signal Q' rapidly declines such as is denoted by reference numeral Q3', and the capacitor is charged in the opposite direction. In the static state period A4, the actual angular velocity Q of the camera body 1 reaches zero such as is denoted by reference numeral Q4, whereupon the charge that is accumulated in the capacitor in the high-pass filter is discharged according to the time constant of the high-pass filter, and the angular velocity signal Q' increases such as is denoted by reference numeral Q4'.

Put another way, whereas the transition of the actual angular velocity Q of the camera body 1 and the transition of the angular velocity signal Q' correspond to the rotational motion operation commencement period A1 and the rotation operation termination period A3, the angular velocity signal Q' is observed to decline because the angular velocity signal Q' declines as a consequence of the discharge of the charge in accordance with the time constant of the high-pass filter with regard to the rotational driving photography period A2, which is intended to maintain a constant angular velocity.

In contrast, the angular velocity signal Q' is observed to accelerate with regard to the static state period A4, wherein the camera body 1 is intended to remain stationary, until such time as the angular velocity signal Q' is normalized as a consequence of the discharge of the charge in accordance with the time constant τ of the high-pass filter.

Accordingly, when performing a photography immediately after transitioning to the static state period A4, as an instance thereof, the angular velocity signal Q' is not fully normalized, and the angular velocity signal Q' is thus obtained so as to cause the camera body 1 to appear to be making a large movement, despite the camera body 1 actually being stationary, and thus, performing the correction of the movement of the shaking hand in accordance with the angular velocity signal Q' that results therefrom will result in a significantly blurred photograph.

Thus, a movement of the shaking hand/pan-tilt determination unit is incorporated into a conventional imaging device. When it is determined by the movement of the shaking hand/pan-tilt determination unit that a pan or a tilt is taking place, it is thereby possible to take a photograph without waiting for the charge that is accumulated in the high-pass filter to be caused thereby to rapidly discharge, and for the angular velocity signal Q' that is thus outputted from the high-pass filter to be normalized by way of the time constant.

The movement of the shaking hand/pan-tilt determination unit determines that either a pan photograph or a tilt photograph is being performed when the angular velocity signal sustains a value that is greater than a prescribed threshold value over a prescribed time.

The movement of the shaking hand/pan-tilt determination unit determines, however, that the pan photograph, or the tilt photograph, is taking place based only upon the size of the angular velocity signal, regardless of whether or not the actual angular velocity of the camera body 1 is accelerating or decelerating. Thus, it is not possible to correctly detect a timing whereat an actual acceleration of the camera body 1 ends and a transition to a driving at a uniform speed takes place, as well as a timing whereat a deceleration of the camera body 1 ends and a transition to the stationary state takes place, and a fault occurs with the correction of the movement of the shaking hand, such as when the camera body 1 is taking a photograph while driving at the uniform speed, i.e., a tracking shot, or when the camera body 1 is taking a photograph immediately after coming to a stop.

SUMMARY OF THE INVENTION

Therefore, an object of the present invention is to provide an imaging device and an image blurring correction device that is capable of accurately performing a correction of a movement of a shaking hand of a tilt immediately after taking a tracking shot or a pan photograph.

To accomplish the above object, an imaging device according to one embodiment of the present invention includes an angular velocity sensor that detects a shaking of a camera body and that outputs a blurring signal, a high-pass filter that eliminates a direct current component that is included within the blurring signal in accordance with a first time constant, and that outputs a fluctuation portion of the blurring signal with respect to a reference voltage as an angular velocity signal, an analog switch that causes a charge that is accumulated within the high-pass filter to discharge according to a second time constant that is less than the first time constant, a computation unit that receives an input of the angular velocity signal, and that performs a computation in order to correct a blurring of an image in accordance with the angular velocity signal thus inputted thereto, a detection unit that, in order to detect a change over time of the angular velocity of the camera body, samples the angular velocity signal on a per fixed time interval basis, obtains a derivative in accordance with a value thus sampled of the angular velocity signal, and detects a change over time in a size of the derivative thus obtained, and a switching unit that switches the time constant of the high-pass alter between the first time constant and the second time constant of the high-pass filter by controlling a switching on or off of the analog switch in accordance with a detection result of the detection unit. A predetermined absolute threshold value is installed into the detection unit, and the detection unit includes a determination unit that computes a contiguous time interval from a time whereat an absolute value of the size of the derivative is greater than or equal to the absolute threshold value to a time whereat the absolute value of the size of the derivative is less than the absolute threshold value, and that determines whether or not the contiguous time interval is greater than a predetermined threshold time interval. The switching unit switches the analog switch on, in order to cause the charge that is accumulated within the high-pass filter to discharge according to the second time constant, when the determination unit determines that the absolute value of the size of the derivative is less than the absolute threshold value, and that the contiguous time interval is greater than the threshold time interval.

In an imaging device according to another embodiment, a predetermined first absolute threshold value and a predetermined second absolute threshold value is installed into the detection unit, and the detection unit includes a determination unit that computes a contiguous time interval from a time whereat an absolute value of the size of the derivative is greater than or equal to the first absolute threshold value to a time whereat the absolute value of the size of the derivative is less than the first absolute threshold value, that determines whether or not the contiguous time interval is greater than a predetermined threshold time interval, and that determines whether or not a derivative of an output of the high-pass filter is greater than the second absolute threshold value. The switching unit is configured to switch the analog switch on, in order to cause the charge that is accumulated within the high-pass filter to discharge according to the second time constant, when the determination unit determines that the absolute value of the size of the derivative is less than the first absolute threshold value, and that the contiguous time interval is greater than the threshold time interval, when the derivative of the output of the high-pass filter is greater than the second absolute threshold value.

DETAILED DESCRIPTION OF THE PREFERRED EMBODIMENTS

Following is a detailed description of preferred embodiments of a digital camera as an imaging device according to the present invention, with reference to the accompanying drawings.

First Embodiment

Figure 3:
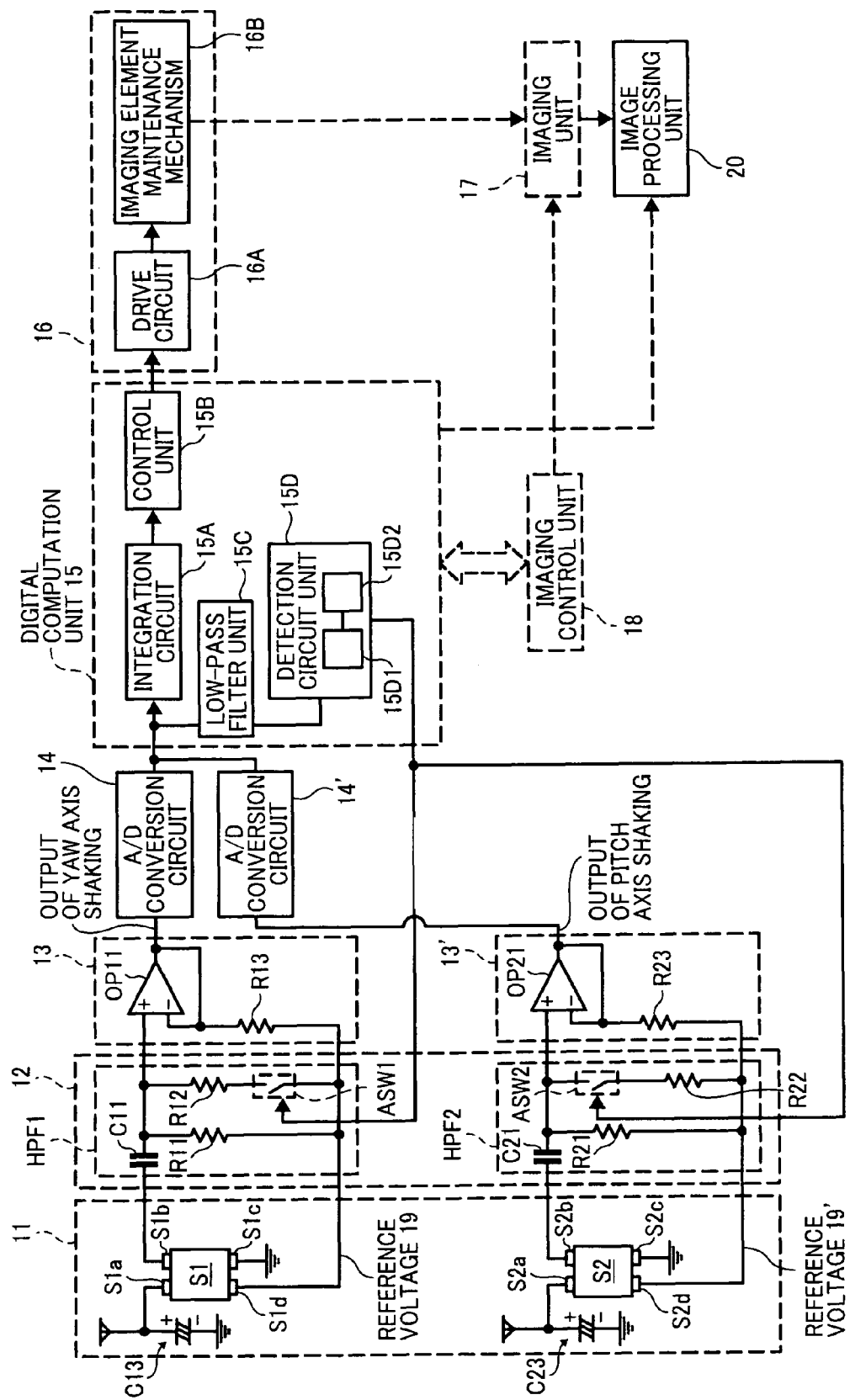
FIG. 3 is a block circuit diagram according to an embodiment of an imaging device according to the present invention.

FIG. 3 is a block circuit diagram of a movement of a shaking hand correction circuit of an imaging device according to the present invention. In FIG. 3, reference numeral 11 is an angular velocity sensor, reference numeral 12 is a high-pass filter circuit unit, reference numeral 13 and 13' is an amplifier circuit, reference numeral 14 and 14' is an A/D conversion circuit, reference numeral 15 is a digital computation unit, reference numeral 16 is a blurring correction device, reference numeral 17 is an imaging unit, and reference numeral 18 is an imaging control unit. The angular velocity sensor 11 is configured, as an instance thereof, from a gyroscope sensor S1, which detects a shaking along a yaw axis, and a gyroscope sensor S2, which detects a shaking along a pitch axis.

In the present circumstance, the high-pass filter circuit unit 12 is configured from a high-pass filter unit HPF 1 and HPF 2, which is for eliminating an offset voltage. The high-pass filter unit HPF 1 is configured from a capacitor C11, a resistor R11, a resistor R12, and an analog switch ASW 1. The high-pass filter unit HPF 2 is configured from a capacitor C21, a resistor R21, a resistor R22, and an analog switch ASW 2.

A first terminal S1a of the gyroscope sensor S1 is connected to a positive terminal of a power supply capacitor C13, and a negative terminal of the capacitor C13 is grounded. A prescribed voltage is impressed upon the positive terminal of the capacitor C13. A second terminal S2a of the gyroscope sensor S2 is connected to a positive terminal of a power supply capacitor C23, and a negative terminal of the capacitor C23 is grounded. A prescribed voltage is impressed upon the positive terminal of the capacitor C23.

A second terminal, i.e., an output terminal, S1b of the gyroscope sensor S1 is connected to one side of the capacitor C11. A third terminal S1c of the gyroscope sensor S1 is grounded. A fourth terminal S1d of the gyroscope sensor S1 is connected to a reference voltage impression line 19. Another side of the capacitor C11 is connected to one side of the resistor R11 and is also connected to one side of the resistor R12.

Another side of the resistor R11 is connected to the reference voltage impression line 19. Another side of the resistor R12 is connected to the reference voltage impression line 19 by way of the analog switch ASW 1. The capacitor C11 and the resistor R11 configure the high-pass filter. The resistor R11 and the analog switch ASW 1 configure an electrical discharge circuit. The analog switch ASW 1 is switched on and off by a switching signal (to be described hereinafter). A resistance value of the resistor R12 is much less than a resistance value of the resistor R11. A first time constant of the high-pass filter unit HPF 1 is set by the capacitor C11 and the resistor R11, and a second time constant of the high-pass filter unit HPF 1 is set by the capacitor C11, the resistor R11, the resistor R12, and the analog switch ASW 1.

A second terminal, i.e., an output terminal, S2b of the gyroscope sensor S2 is connected to one side of the capacitor C21. A third terminal S2c of the gyroscope sensor S2 is grounded. A fourth terminal S2d of the gyroscope sensor S2 is connected to a reference voltage impression line 19'. Another side of the capacitor C21 is connected to one side of the resistor R21 and is also connected to one side of the resistor R22, by way of the analog switch ASW 2. Another side of the resistor R21 and the resistor R22 is connected to the reference voltage impression line 19'.

The capacitor C21 and the resistor R21 configure the high-pass filter, and the resistor R22 and the analog switch ASW 2 configure an electrical discharge circuit. The analog switch ASW 2 is switched on and off by a switching signal (to be described hereinafter). A resistance value of the resistor R21 is much less than a resistance value of the resistor R22. A first time constant of the high-pass filter unit HPF 2 is set by the capacitor C21 and the resistor R21, and a second time constant of the high-pass filter unit HPF 2 is set by the capacitor C21, the resistor R21, the resistor R22, and the analog switch ASW 2. In the present circumstance, the resistor R12 and the resistor R22 denote a uniform resistance of the analog switch ASW 1 and ASW 2. A value of the uniform resistance thereof ranges from several dozen ohms to several hundred ohms.

The amplifier circuit 13 is configured from an operational amplifier OP11 and a resistor 13. The amplifier circuit 13' is configured from an operational amplifier OP21 and a resistor 23. A positive terminal of the operational amplifier OP11 is connected to one side of the resistor R12. A negative terminal of the operational amplifier OP11 is connected to one side of a resistor R13. Another side of the resistor R13 is connected to the reference voltage impression line 19. An output terminal of the operational amplifier OP11 is connected to the negative terminal of the operational amplifier OP11 and to one side of the resistor R13.

A positive terminal of the operational amplifier OP21 is connected to one side of the resistor R22, by way of the analog switch ASW 2. A negative terminal of the operational amplifier OP21 is connected to one side of a resistor R23. Another side of the resistor R23 is connected to the reference voltage impression line 19'. An output terminal of the operational amplifier OP21 is connected to the negative terminal of the operational amplifier OP21 and to one side of the resistor R23.

An angular velocity signal that is outputted from the operational amplifier OP11 and an angular velocity signal that is outputted from the operational amplifier OP21 is inputted into the digital computation unit 15 by way of the A/D conversion circuit 14 and 14'. A detailed description of a configuration of the digital computation unit 15 will be provided hereinafter.

The imaging unit 17 is essentially configured, as an instance thereof, from a lens barrel unit and an imaging element. A CCD or a CMOS sensor is employed as the imaging element, as an instance thereof. The lens barrel unit is essentially configured from such as an imaging lens, a shutter mechanism, an aperture mechanism, a zoom mechanism, and a focusing mechanism. A configuration thereof is generally known, and thus, a detailed description thereof will be omitted herein.

A transmission and reception of such information as an exposure timing is performed between the imaging control unit 18 and the digital computation unit 15. The imaging control unit 18 controls a drive of the lens barrel unit in accordance with an instruction of the digital computation unit 15, and such a control is performed as a zoom operation, a focusing operation, an exposure adjustment, an exposure operation, or a transfer of a photographic image to an image processing unit 20. An imaging data of the imaging unit 17 is inputted into the image processing unit 20. The image processing unit 20 outputs an image process data to either a memory or a display unit, in accordance with the instruction of the digital computation unit 15.

The digital computation unit 15 comprises an integration circuit 15A, a control unit 15B, a low-pass filter unit 15C, and a detection circuit unit 15D. The low-pass filter unit 15C is installed in a forepart of the detection circuit unit 15D. The angular velocity signal being digitally converted, a fluctuation component thereof is inputted into, and integrated by, the integration circuit 15A, and converted into an angular signal. The angular signal thus converted is inputted into the control unit 15B. The control unit 15B generates a movement of a shaking hand correction control signal in accordance with the angular signal that is inputted thereto.

The blurring correction device 16 is essentially configured, as an instance thereof, from such as an image element maintenance mechanism 16I3, which incorporates a stage that supports the imaging element and an actuator, such as a voice coil motor, and a drive circuit 16A that drives the actuator. The drive circuit 16A controls a drive of the stage in a direction that corrects an image blurring, in accordance with the movement of the shaking hand correction control signal from the control unit 15B. The stage is moved thereby in a direction wherein the image blurring is eliminated. Whereas a configuration that is described in the present circumstance corrects the image blurring by moving the imaging element, it is to be understood that it would be possible as well to adopt a configuration that instead anchors the image element and eliminates the image blurring by moving the imaging lens.

A high frequency fluctuation component is removed from the angular velocity signal by way of the low-pass filter unit 15C, and the angular velocity signal thus filtered is thereafter inputted into the detection circuit unit 15D. The detection circuit unit 15D is formed from a detection unit 15D1 and a switching unit 15D2. The detection unit 15D1 comprises a function that samples the angular velocity signal at a given time interval, takes a derivative in accordance with a value thus sampled of the angular velocity signal, and detects an alteration over time of a size of the derivative thus taken, in order to detect a change over time of the angular velocity of the camera body 1.

The switching unit 15D2 comprises a function that switches the time constant of the high-pass filter unit HPF 1 and HPF 2 between the first time constant and the second time constant thereof, by controlling the switching on and off of the analog switch ASW 1 and ASW 2 in accordance with a result of the detection performed by the detection unit 15D1.

The detection unit 15D1 comprises a predetermined absolute threshold value L1, a counter, which is for computing a contiguous time interval from a point in time wherein an absolute value of the size of the derivative is greater than or equal to the absolute threshold value L1 to a point in time wherein the absolute value of the size of the derivative is less than the absolute threshold value L1, and a determination unit, which is for determining whether or not the contiguous time interval thus computed is greater than a threshold time T1. The absolute threshold value L1 is set with the size of the actual angular velocity of the camera body 1 taken into consideration. In addition, in the present circumstance, the absolute threshold value L1 is set to be somewhat large, in order to avoid a determination that the movement of the shaking hand is a pan photograph or a tilt photograph. The threshold time T1 is set with the acceleration and deceleration curve of the actual angular velocity of the camera body 1 when taking such as the pan photograph taken into consideration.

When the analog switch ASW 1 and ASW 2 is switched on, an interval between the capacitor C11 and the reference voltage impression line 19, and an interval between the capacitor C21 and the reference voltage impression line 19', is short circuited, by way of the analog switch ASW 1 and ASW 2, and the time constant thereof is switched from the first time constant t to the second time constant $\tau'$. Consequently, the charge that is accumulated in the capacitor C11 and C21 is rapidly discharged, the direct current component of the HPF 1 and HPF 2 is removed, and the angular velocity signal of the high-pass filter HPF 1 and HPF 2 is promptly normalized to a reference voltage. After the high-pass filter unit HPF 1 and HPF 2 switches from the first time constant $\tau$ to the second time constant $\tau'$, the time constant is once again switched back from the second time constant $\tau'$ to the first time constant $\tau$ after a set time interval T2 has passed.

It is desirable for the set time interval T2 to be an amount of time that is adequate for the charge with which the high-pass filter unit HPF 1 and HPF 2 is charged to be sufficiently discharged. The set time interval T2 is set to be shorter than the first time constant $\tau$ and longer than the second time constant $\tau'$. It is preferable for the set time interval T2 to be on the order of six times the second time constant $\tau'$.

The first time constant of the high-pass filter unit HPF 1 and HPF 2 is equal to R11×C11=R21×C21. If it is presumed that the resistor value R12 and R22 of the analog switch ASW 1 and ASW 2 is ½₀₀ of the resistor value R11 and R21, then when a composite resistance of the resistor a11 and the resistor R12 is R12<<R11, or a composite resistance of the resistor R21 and the resistor R22 is R22<<R21, the composite resistance thereof is nearly equivalent to R12, or R22, and the second time constant $\tau'$ when the analog switch ASW 1 and ASW 2 is switched on will be ½₀₀ of the first time constant X when the analog switch ASW 1 and ASW 2 is switched off.

Accordingly, when the first time constant $\tau$ is 1.55 seconds when the analog switch ASW 1 and ASW 2 is switched off, wherein a cut-off frequency $f=1/(2\pi*\tau)=0.1$ Hz, the second time constant $\tau'$ will be 0.008 seconds. Thus, it is desirable that the set time interval T2 that switches on the analog switch ASW 1 and ASW 2 be greater than or equal to 0.048 seconds and also shorter than the threshold time T1.

Figure 4:
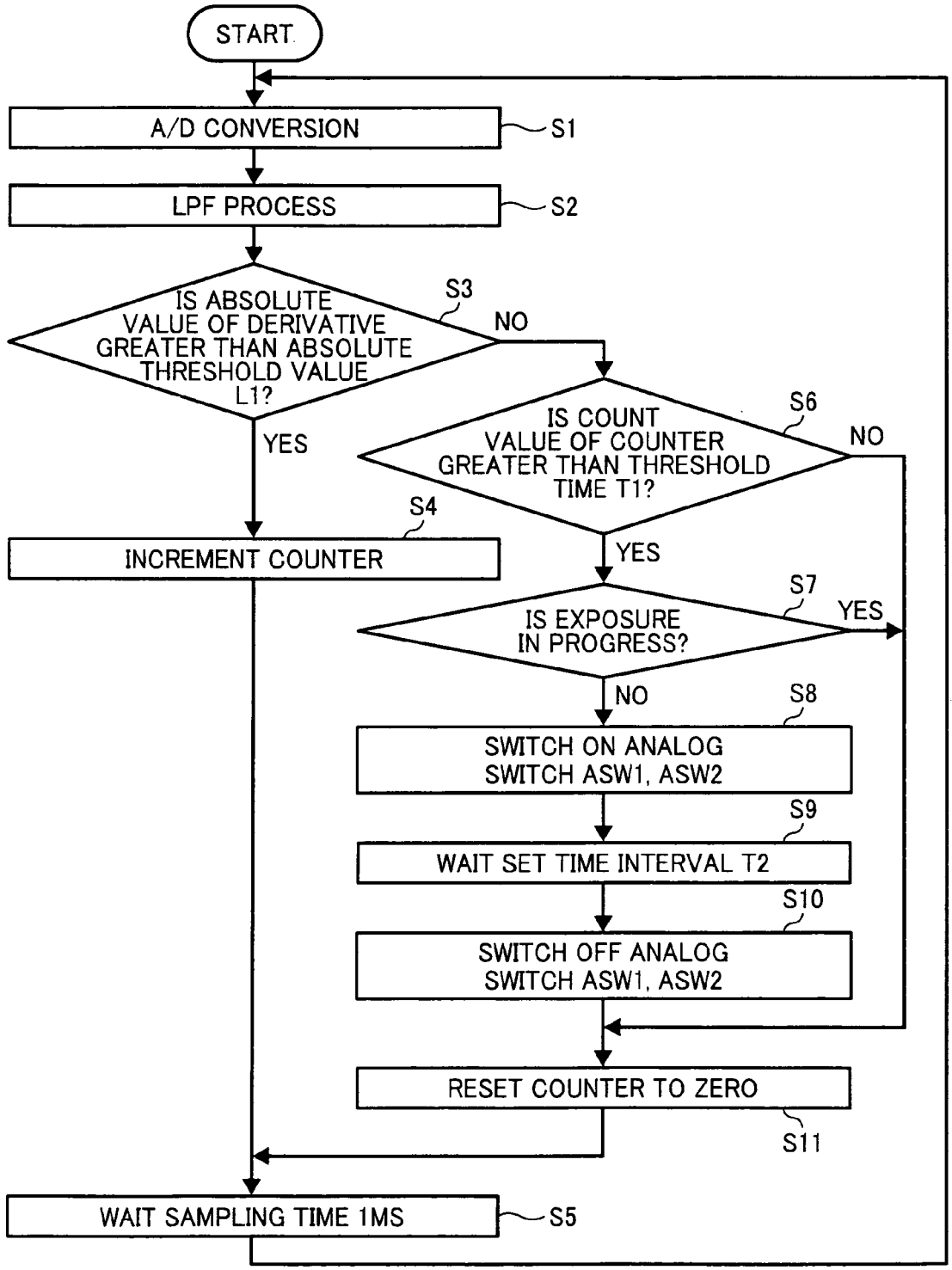
FIG. 4 is a flowchart that describes an effect of an imaging device according to a first embodiment of the present invention.
Figure 5:
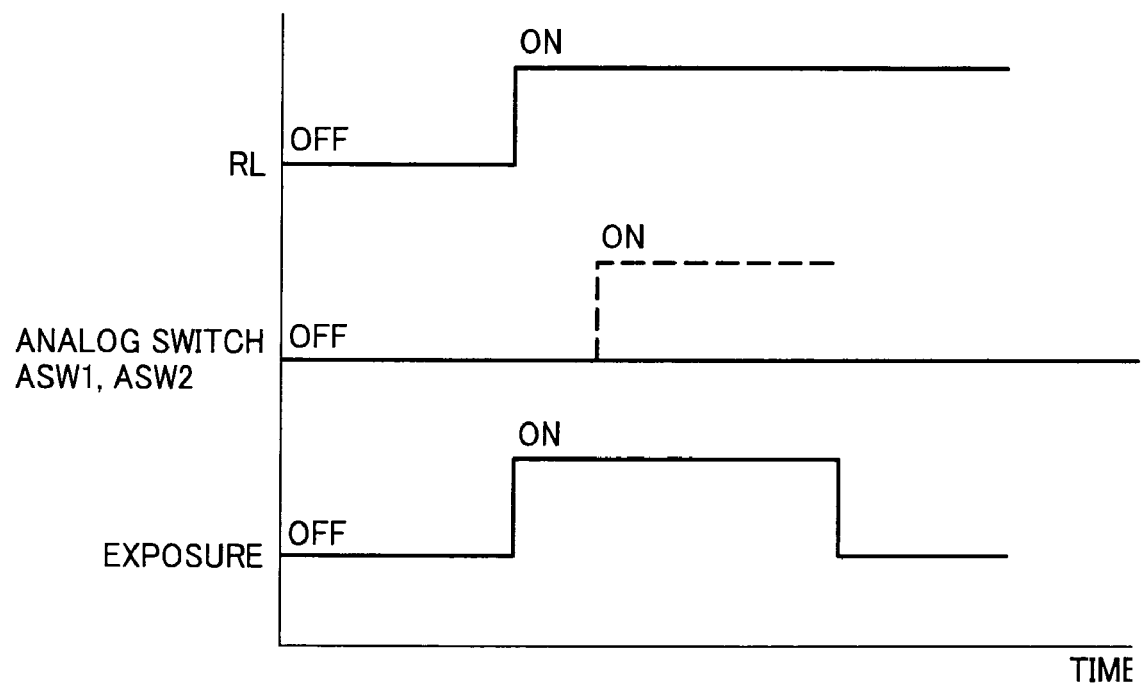
FIG. 5 is an operation timing chart of the imaging device according to the first embodiment of the present invention.
Figure 6:
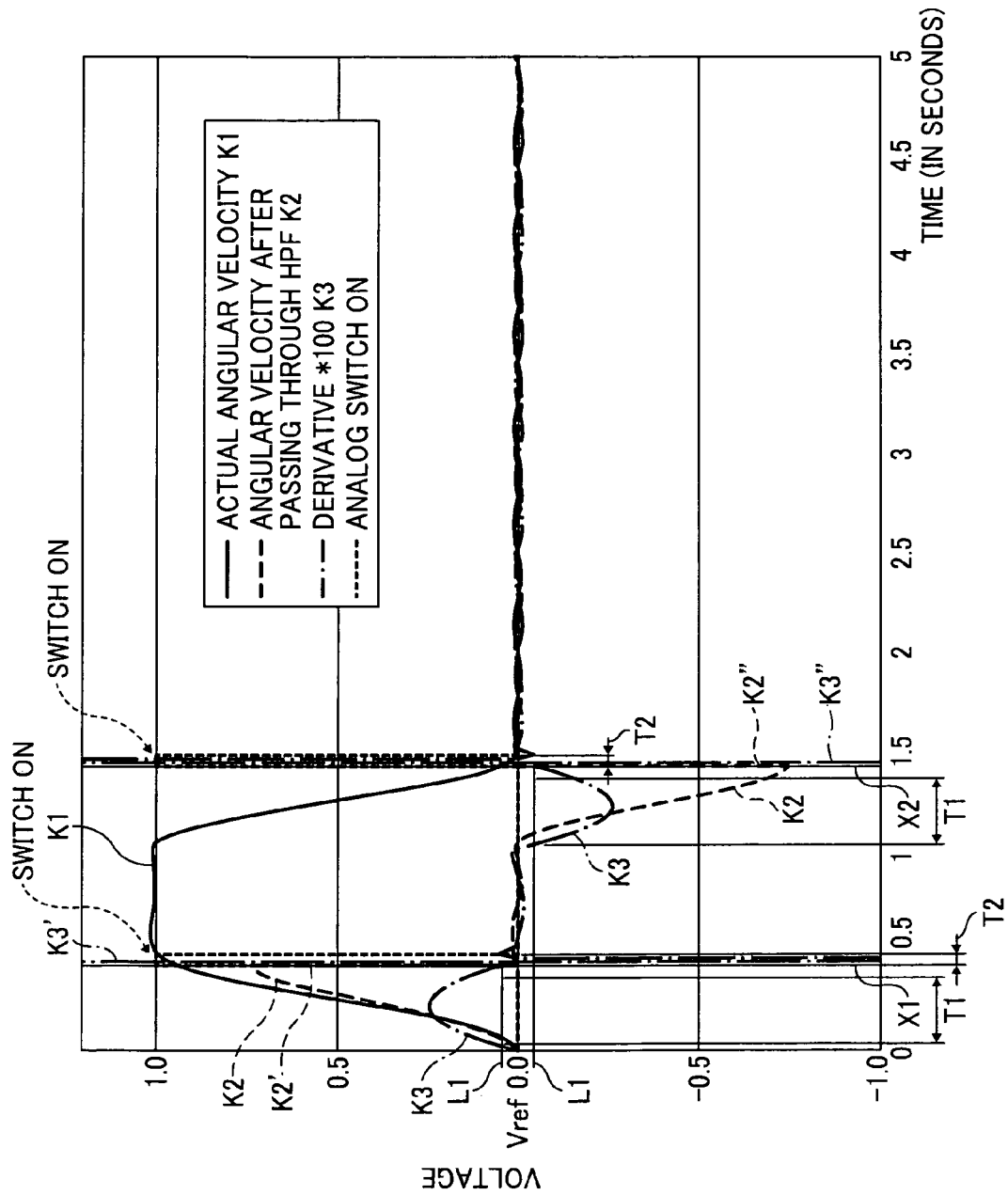
FIG. 6 is a graph that describes a relation between an angular velocity curve, an angular velocity signal, and a derivative curve, of the imaging device according to the first embodiment of the present invention.

Following is a description of an instance of an effect of an imaging device and an image blurring correction device according to the present invention, with reference to FIG. 4 through FIG. 6.

FIG. 4 is a flowchart that describes a relation between an attitudinal alteration operation of the camera body 1 and a time constant switching operation of the high-pass filter, according to the present invention. In the present circumstance, it is presumed that a movement of a shaking hand correction switch is switched on.

When taking a pan photograph, or a tilt photograph, wherein a photograph is taken while a facing of the camera body 1 is altered, a blurring signal is outputted from the angular velocity sensor 11. The blurring signal thus outputted is inputted into the high-pass filter circuit unit 12. An angular velocity signal that is based upon the blurring signal thus inputted is amplified by the amplifier circuit 13 and 13', and is thereafter inputted into the A/D converter circuit 14 and 14'. In step S.1, the angular velocity signal thus inputted is converted from analog to digital by the A/D converter circuit 14 and 14'. Thus converted, a resulting angular velocity data is inputted into the digital computation unit 15.

The angular velocity data is inputted into the integration circuit 15A and the low-pass filter unit 15C. In step S.2, the low-pass filter unit 15C performs a low-pass filter (LPF) process upon the angular velocity data thus inputted thereto, in order to remove a high frequency noise therefrom. The angular velocity data, wherefrom the high frequency noise has been removed, is thereafter inputted into the detection circuit unit 15D.

The detection unit 15D1 computes a differential between a value of the angular velocity data at a prior sampling and a value of the angular velocity data at a current sampling, or, put another way, a derivative of the angular velocity signal, i.e., the angular velocity. Thereafter, in step S.3, a determination is made as to whether or not an absolute value of the derivative thereof is greater than the absolute threshold value L1.

If the absolute value of the derivative thereof is greater than the absolute threshold value L1, then, in step S.4, the detection unit 15D1 increments the counter therein. Thereafter, the process proceeds to step S.5, wherein a sampling process wait is performed for a prescribed interval, whereupon the process returns to step S.1 and performs the process from step S.1 to step S.3. If the absolute value of the derivative thereof is greater than the absolute threshold value L1, then the process from step S.1 to step S.5 is continued, and a count value of the counter is incremented by one with each iteration thereof.

If the absolute value of the derivative thereof is less than the absolute threshold value L1, then, in step S.6, the detection unit 15D1 determines whether or not the count value of the counter is greater than the threshold time T1. Put another way, the detection unit 15D1 determines whether or not the absolute value of the derivative thereof is less than or equal to the absolute threshold value L1 after a contiguous interval wherein the absolute value of the derivative thereof is greater than or equal to the absolute threshold value L1 has been sustained for an interval that is greater than or equal to the threshold time T1.

If the count value of the counter is less than the threshold time T1 in step S.6, then the process proceeds to step S.11, wherein the counter is reset to zero. Thereafter, the process proceeds to step S.5, wherein the sampling process wait is performed, whereupon the process returns to step S.1 and performs the process beginning in step S.1 once more. The process described herein is a process loop that corresponds to a shaking of the camera body 1 in a circumstance other than taking the pan photograph or the tilt photograph.

Figure 1:
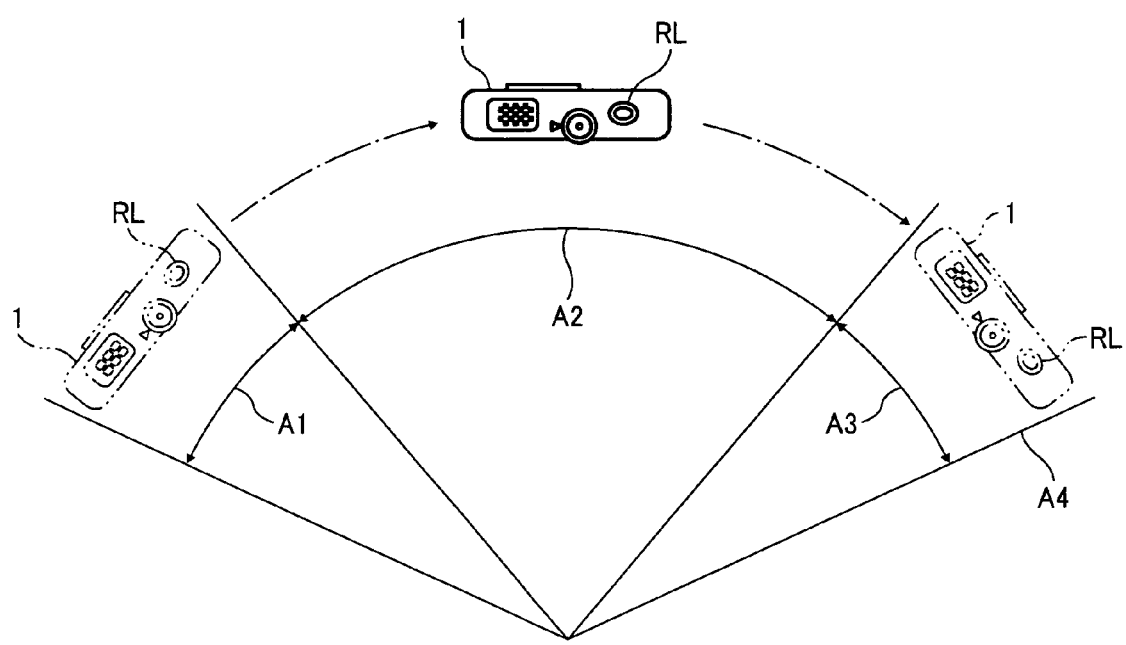
FIG. 1 is a schematic diagram that describes taking a pan photograph.
Figure 2:
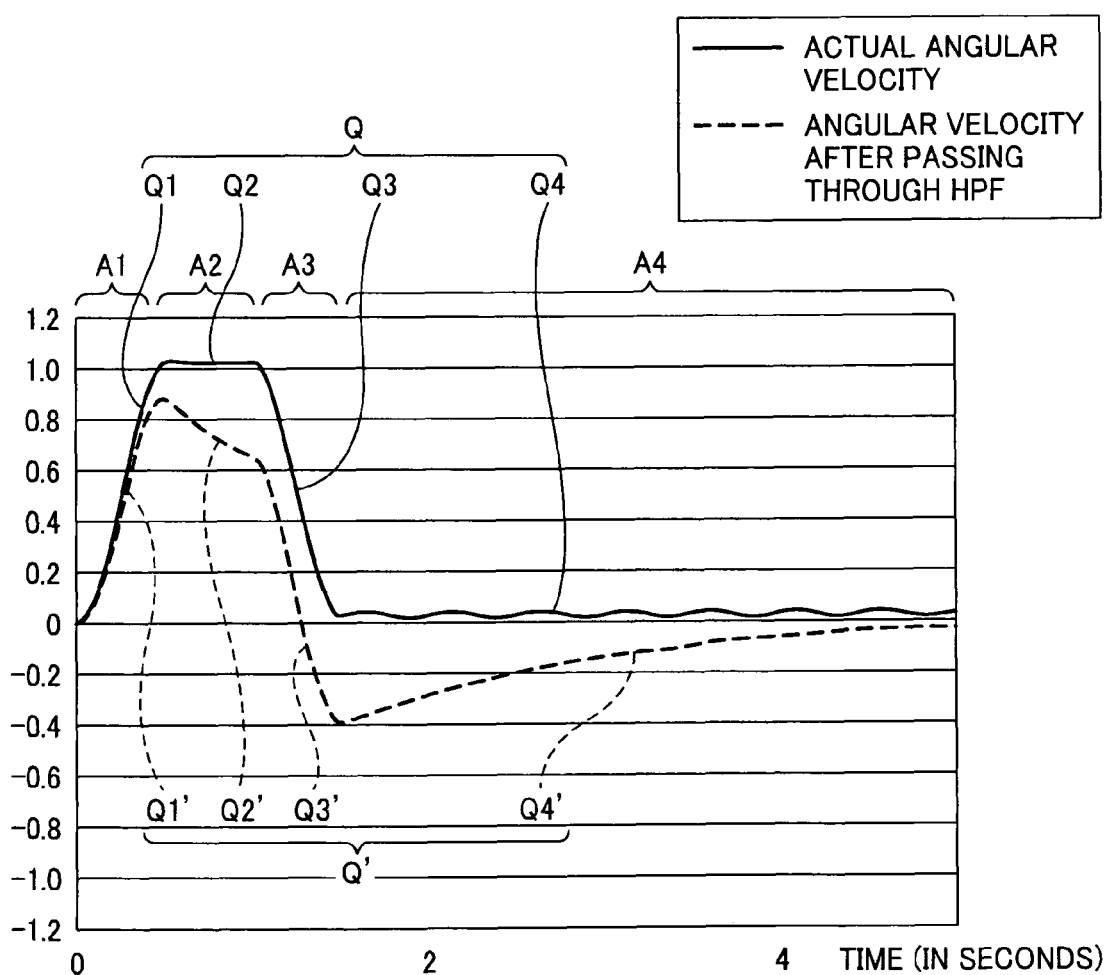
FIG. 2 is a graph that describes a relation between a transition of angular velocity and an angular velocity signal of a conventional camera body when taking a pan photograph.

If the count value of the counter is greater than the threshold time T1, or, put another way, if the absolute value of the derivative thereof is less than or equal to the absolute threshold value L1 after the contiguous interval wherein the absolute value of the derivative thereof is greater than or equal to the absolute threshold value L1 has been sustained for the interval that is greater than or equal to the threshold time T1, then, in step S.7, a determination is made as to whether or not an exposure is in progress due to an operation of a release button RL that is depicted in FIG. 1. If it is determined that the exposure is in progress, then the process proceeds to step S.11, wherein the counter is reset to zero, skipping a process in step S.8 to S.10 (to be described hereinafter). Thereafter, the process proceeds to step S.5, wherein the sampling process wait is performed, whereupon the process returns to step S.1 and repeats the process beginning in step S.1. Accordingly, during the exposure, with the analog switch ASW 1 and ASW 2 not switched on, such as is depicted in FIG. 5, the time constant of the high-pass filter unit HPF 1 and HPF 2 is not changed from the first time constant τ to the second time constant τ', and it is possible thereby to avoid an occurrence of a blurred photographic image that is caused by a rapid change in the angular velocity signal. Put another way, the change of the constant of the high-pass filter circuit unit 12 is prohibited during the exposure.

If it is determined in step S.7 that the exposure is not in progress, then, in step S.8, the analog switch ASW 1 and ASW 2 is switched on. Switching on the analog switch ASW 1 and ASW 2 causes the charge that is accumulated within the high-pass filter unit HPF 1 and HPF 2 to be rapidly discharged.

Thereafter, the process proceeds to step S.9, wherein a discharge process wait is performed over the interval of the set time interval T2. Thereafter, in step S.10, the analog switch ASW 1 and ASW 2 is switched off. Concurrently therewith, in step S.11, the counter is reset to zero, and the process proceeds to step S.5, returning thereafter to step S.1, whereupon the correction of the movement of the shaking hand is continued.

FIG. 6 illustrates a relation between an actual angular velocity curve, an angular velocity signal curve, and a derivative curve, in accordance with the attitudinal change of the camera body 1 when taking the pan photograph in a circumstance wherein the electrical discharge process that is depicted in FIG. 4 is performed. In FIG. 6, reference numeral K1 is either an actual angular velocity curve or an angular velocity of the camera body 1, denoted by a solid line therein, reference numeral K2 is either an angular velocity signal curve or an angular velocity signal that is outputted by the high-pass filter circuit unit 12, denoted by a dashed line therein, and reference numeral K3 is a derivative curve that is obtained by the derivative process in accordance with the sampling that is described herein, denoted by a single point chain line therein. An x axis thereof denotes a time until the taking of the pan photograph in completed, in seconds, with the time point whereat the taking of the pan photograph commences being treated as zero seconds.

In addition, a y axis thereof is a voltage value, which is dependent upon a sensitivity of the angular velocity sensor 11, and zero thereof corresponds to a reference voltage Vref. In FIG. 6, a maximum voltage value when taking the pan photograph is represented as 1, in order to make it easier to understand the invention. In addition, the derivative value is denoted with a sampling period of the angular velocity data as one millisecond, with the differential of each respective sampling value being represented with a voltage value 100 times thereof.

If it is determined at a time X1, which is when the taking of the pan photograph commences, i.e., when the acceleration of the angular velocity ends, and which is after the sustained time wherein the derivative is greater than or equal to the absolute threshold value L1 is greater than or equal to the threshold time T1, that the derivative is now less than or equal to the absolute threshold value L1, then the analog switch ASW 1 and ASW 2 is switched on.

As a consequence thereof, the time constant of the high-pass filter circuit unit 12 is switched from the first time constant τ to the second time constant τ'. Thus, the charge that is accumulated within the high-pass filter circuit unit 12 is discharged, such as is denoted at reference numeral K2', and the angular velocity signal K2 declines rapidly until it is normalized to Vref. In accordance with the rapid decline of the angular velocity signal K2, the derivative rapidly increases and declines, such as is denoted at reference numeral K3'. It is to be understood that the set time interval T2 is set so as to be greater than the second time constant τ', and thus, that the charge that is accumulated within the high-pass filter circuit unit 12 is sufficiently discharged.

In addition, if it is determined at a time X2, which is when the taking of the pan photograph ends, i.e., when the deceleration of the angular velocity ends, and which is once again after the sustained time wherein the derivative is greater than or equal to the absolute threshold value L1 is greater than or equal to the threshold time T1, that the derivative is now less than or equal to the absolute threshold value L1, then the analog switch ASW 1 and ASW 2 is switched on in a manner similar to the switching on of the analog switch ASW 1 and ASW 2 at the time X1.

As a consequence thereof, the time constant of the high-pass filter circuit unit 12 is switched from the first time constant τ to the second time constant τ'. Thus, the charge that is accumulated within the high-pass filter circuit unit 12 is discharged, such as is denoted at reference numeral K2", and the angular velocity signal K2 declines rapidly until it is normalized to Vref. In accordance with the rapid decline of the angular velocity signal K2, the derivative rapidly increases and declines, such as is denoted at reference numeral K3". It is to be understood that, in the present circumstance as well as the previous circumstance, the set time interval T2 is set so as to be greater than the second time constant τ', and thus, that the charge that is accumulated within the high-pass filter circuit unit 12 is sufficiently discharged.

The time X1 corresponds to a time wherein the change of the camera body 1 commences, the time X2 corresponds to a time wherein the change of the camera body 1 ends, and the detection unit 15D1 functions as a detection unit that detects the commencement of the change of direction, and the end of the change of direction, of the camera body 1, by detecting a change over time in the angular velocity of the camera body 1. The switching unit 15D2 functions as a switching unit, which switches the time constant of the high-pass filter circuit unit 12 from the first time constant τ to the second time constant τ', by controlling the switching on and off of the analog switch ASW 1 and ASW 2, when the detection unit 15D1 detects either the commencement of the change of direction, or the end of the change of direction, of the camera body 1, and by restoring the time constant of the high-pass filter circuit unit 12 to the first time constant τ after the initial switch therefrom.

Second Embodiment

Figure 7:
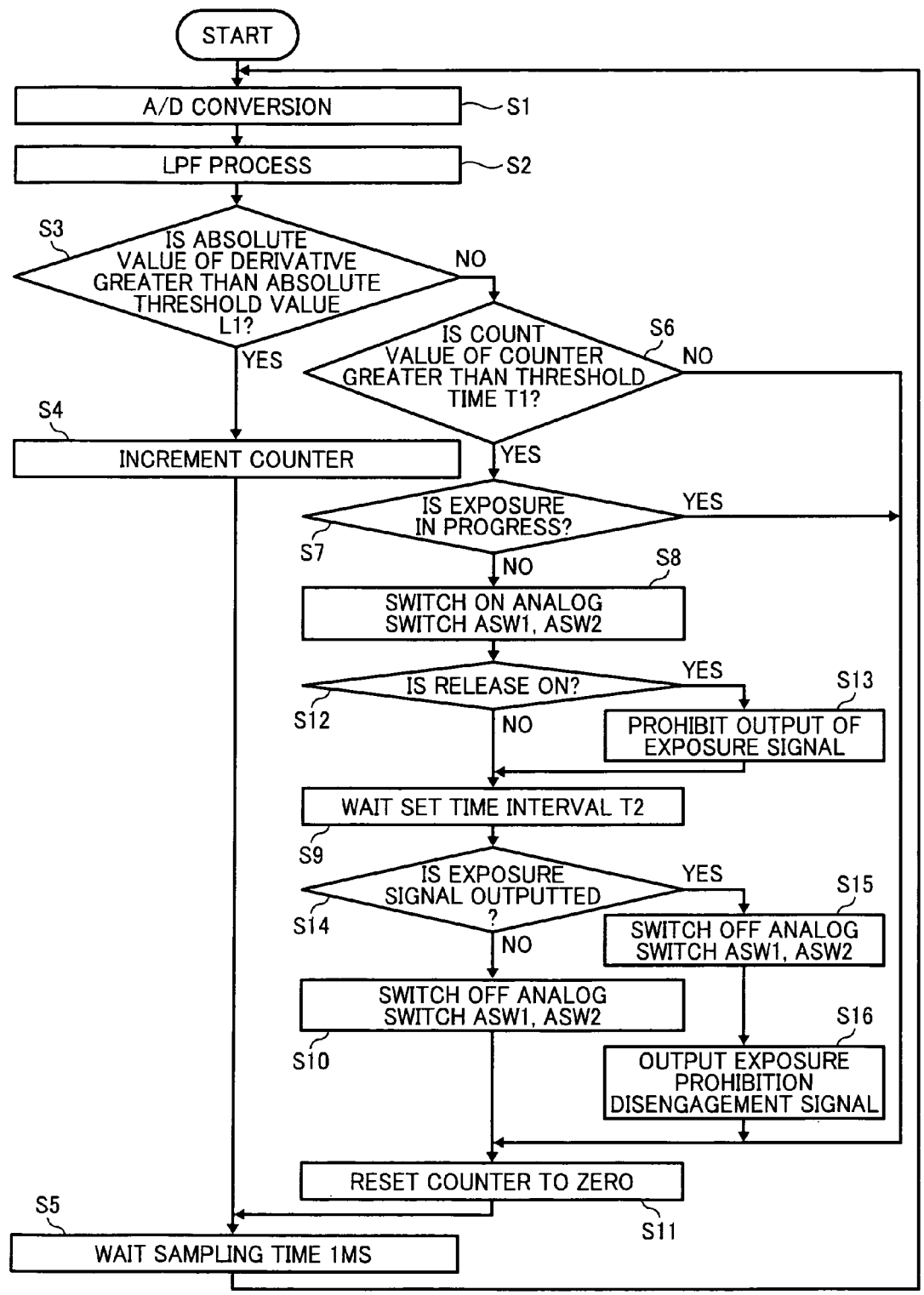
FIG. 7 is a flowchart that describes an effect of an imaging device according to a second embodiment of the present invention.

FIG. 7 is a flowchart that describes an imaging device according to a second embodiment of the present invention. A configuration of the image device according to the second embodiment allows avoiding a generation of a blurred photographic image that is caused by a rapid change in the angular velocity signal when a request to commence an exposure is received during a setting period, wherein the time constant of the high-pass filter is being changed to the second time constant τ'.

According to the second embodiment, in step S.8, the detection circuit unit 15D switches on the analog switch ASW 1 and ASW 2. Thereafter, the process proceeds to step S.12, wherein the detection circuit unit 15D determines whether or not an exposure is in progress due to the operation of the release button RL that is depicted in FIG. 1. If the release button RL has not been pressed, the process proceeds to step S.9, wherein a process is performed in a manner similar to the process according to the first embodiment. If the release button RL has been pressed, the detection circuit unit 15D determines that the exposure request instruction has been issued, and the process proceeds to step S.13, wherein an exposure prohibition signal is outputted to the other processing circuit units of the digital computation unit 16. Thereafter, the process proceeds to step S.9.

Concurrently therewith, in step S.14, a determination is made as to whether or not the detection circuit unit 15D has outputted the exposure prohibition signal, after the set time interval T2 has elapsed. If the detection circuit unit 15D has not outputted an exposure commencement signal, then the process proceeds to step S.10, wherein a process is performed in a manner similar to the process according to the first embodiment. When the detection circuit unit 15D has outputted the exposure commencement signal, then, in step S.15, the analog switch ASW 1 and ASW 2 is switched off. Thereafter, in step S.16, an exposure prohibition cancellation signal is outputted to the other processing circuit units of the digital computation unit 15. Thereafter, the process proceeds to step S.11, wherein a process is performed in a manner similar to the process according to the first embodiment.

Figure 8:
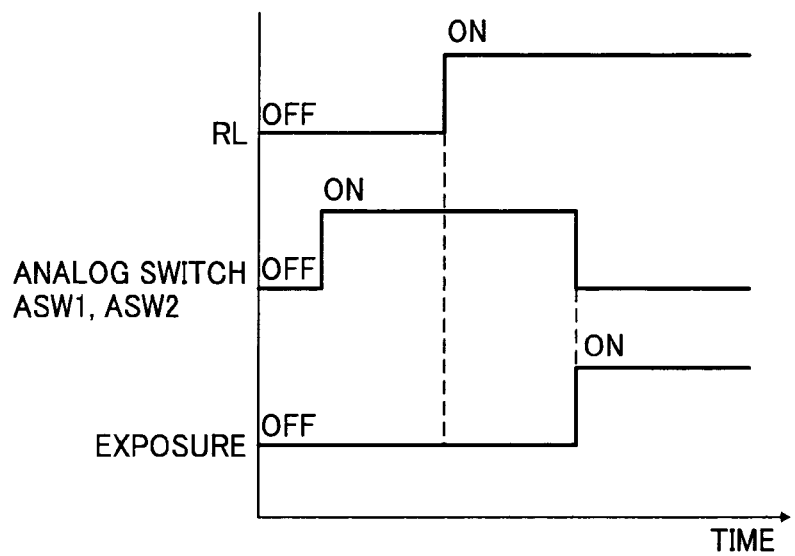
FIG. 8 is an operation timing chart of the imaging device according to the second embodiment of the present invention.

Thus, during the period wherein the analog switch ASW 1 and ASW 2 is switched on, such as is depicted in FIG. 8, or, put another way, when the release button RL has been pressed and the exposure request instruction is issued within the set time interval T2, as is depicted in FIG. 1, the exposure is prohibited, and the exposure commences immediately after the analog switch ASW 1 and ASW 2 is switched off.

According to the second embodiment, it is possible to avoid the occurrence of the blurred photographic image that is caused by a rapid change in the angular velocity signal when a request to commence an exposure is received, during the setting period, wherein the time constant of the high-pass filter is being changed to the second time constant τ', because the exposure commences after the set time interval T2 has elapsed.

Third Embodiment

Figure 9:
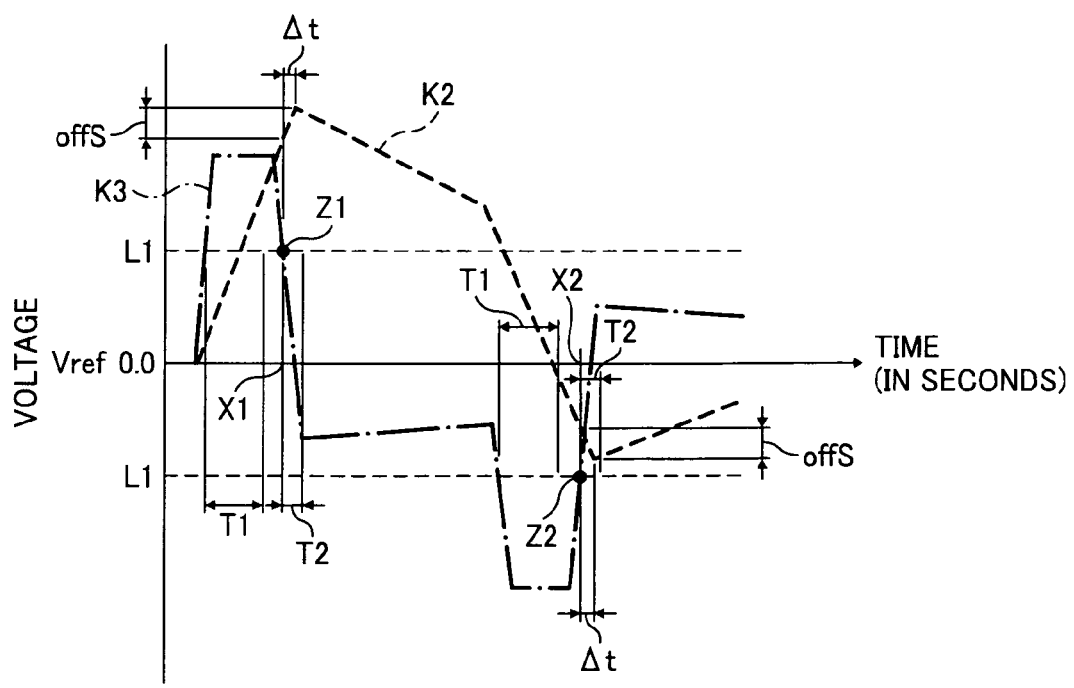
FIG. 9 is an enlargement that describes a fault of the imaging device according to the first embodiment of the present invention, and is a graph that conceptually denotes a relation between an angular velocity curve and a derivative curve thereof.
Figure 10:
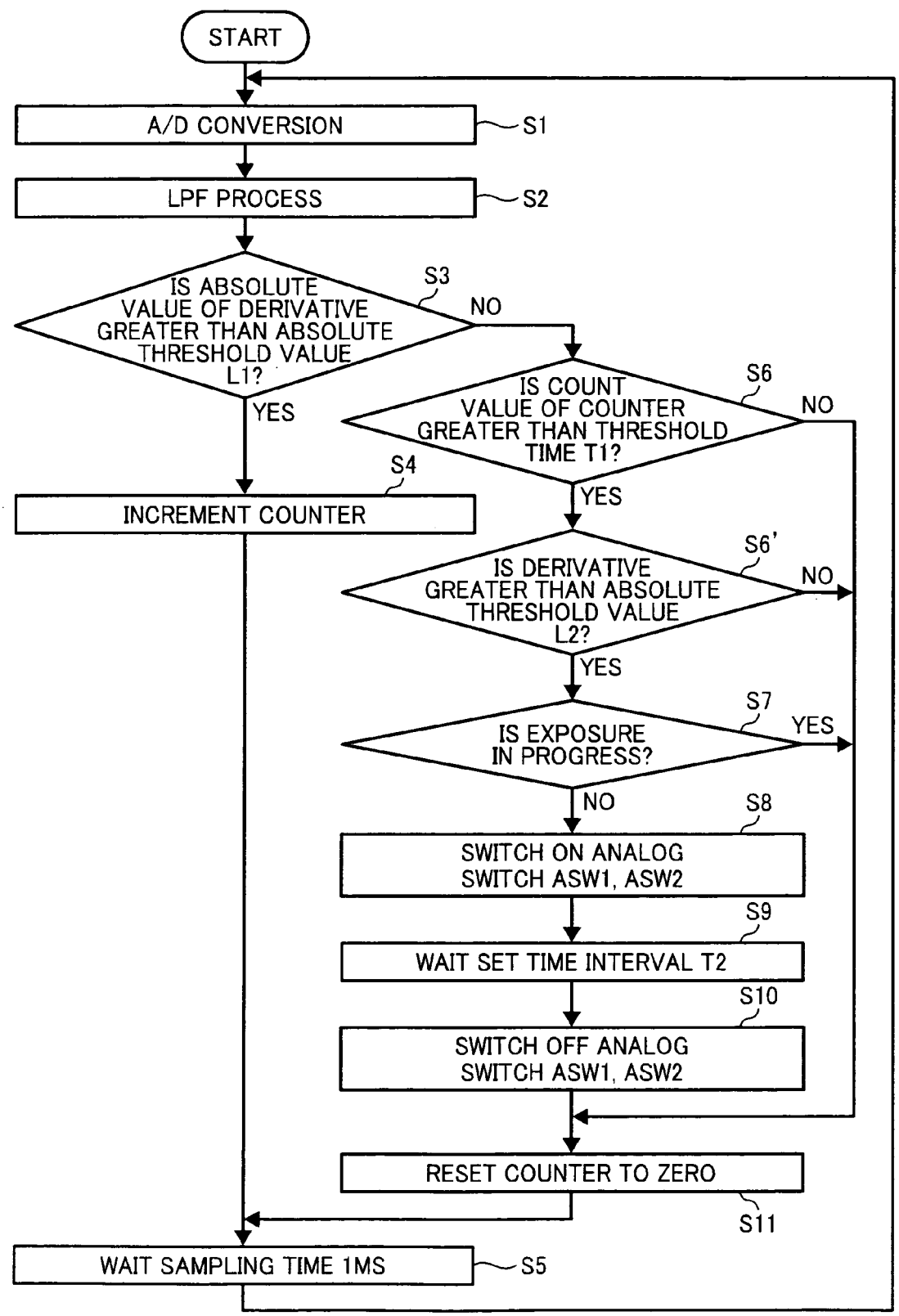
FIG. 10 is a flowchart that describes an effect of an imaging device according to a third embodiment of the present invention.

FIG. 9 to FIG. 12 illustrate an imaging device according to a third embodiment of the present invention. FIG. 9 illustrates an enlargement that describes a fault of the imaging device according to the first embodiment of the present invention, and is a graph that conceptually denotes a relation between the angular velocity curve K2 and the derivative curve K3 thereof.

Whereas the absolute threshold value L1 of the derivative is determined according to the first embodiment by taking the change in the size of the actual angular velocity of the camera body 1 into consideration, a size of the absolute threshold value L1 thereof is set to be to a somewhat larger value than the value thus determined, according to the first embodiment, in order to avoid mistakenly determining that the movement of the shaking hand is the pan photograph or the tilting photograph.

Accordingly, a determination may be made that either the acceleration or the deceleration of the true angular velocity Q of the camera body 1 is finished at a point in time wherein either the acceleration period Q1 of the true angular velocity Q of the camera body 1 or the deceleration period Q3 of the true angular velocity Q of the camera body 1 is not finished.

Put another way, using only the derivative of the absolute threshold value L1 results in a determination that the acceleration of the camera body 1 has finished at a time Z1 (X1) that is significantly prior to the completion of the acceleration period Q1 of the true angular velocity Q of the camera body 1, the analog switch ASW 1 and ASW 2 is switched on at the time Z1 (X1) thereof, and the camera body 1 is still being accelerated even after the charge that is accumulated in the capacitor that is within the high-pass filter circuit unit 12 is discharged in accordance with the second time constant $\tau'$, with a result that a detection timing deviation $\Delta t$ arises, and an offset voltage "offs" arises in line with the detection timing deviation $\Delta t$ that has thus arisen, such as is depicted in FIG. 9. In addition, using only the derivative of the absolute threshold value L1 results in a determination that the deceleration of the camera body 1 has finished at a time Z2 (X2) that is significantly prior to the completion of the deceleration period Q3 of the true angular velocity Q of the camera body 1, the analog switch ASW 1 and ASW 2 is switched on at the time Z2 (X2) thereof, and the camera body 1 is still being decelerated even after the charge that is accumulated in the capacitor that is within the high-pass filter circuit unit 12 is discharged in accordance with the second time constant $\tau'$, with a result that a detection timing deviation $\Delta t$ arises in a manner similar to the acceleration of the camera body 1, and an offset voltage "offs" arises in line with the detection timing deviation $\Delta t$ that has thus arisen, such as is depicted in FIG. 9.

As a consequence thereof, it is not practically possible to reduce the time constant of the high-pass filter circuit unit 12, and it would be difficult, if not impossible, to make the normalization of the angular velocity signal K2 take place any more promptly than is disclosed according to the first embodiment.

According to the third embodiment, there is provided an imaging device that is capable of performing a correction of a movement of a shaking hand immediately after taking a tracking shot or a pan photograph, by accurately detecting a commencement of the taking of the pan photograph, i.e., a completion of an acceleration of the camera body 1, or a completion of the taking of the pan photograph, i.e., a completion of a deceleration of the camera body 1, in a manner that is more reliable than is possible with conventional technology.

Following is a detailed description of the detection thereof, with reference to FIG. 3, and FIG. 10 through FIG. 12.

In the present circumstance, the detection unit 15D1 comprises a predetermined first absolute threshold value L1 and a predetermined second absolute threshold value L2. In the present circumstance, the first absolute threshold value L1 is set to a significantly small value, in order to accurately determine the time Z1 (X1) that is immediately prior to the completion of the acceleration period Q1 of the true angular velocity Q of the camera body 1, and the time Z2 (X2) that is immediately prior to the completion of the deceleration period Q3 of the true angular velocity Q of the camera body 1. The second absolute threshold value L2 is employed in a comparison with an absolute value of an output of the angular velocity signal K2. The second absolute threshold value L2 is employed in detecting whether or not the panning photograph or the tilting photograph is being taken.

When taking a pan photograph, or a tilt photograph, wherein a photograph is taken while a facing of the camera body 1 is altered, a blurring signal is outputted from the angular velocity sensor 11. In step S.1, an angular velocity signal that is generated in accordance with the blurring signal thereof is amplified by the amplifier circuit unit 13 and 13', and inputted thereafter into the A/D conversion unit 14 and 14'. The angular velocity signal thus inputted is converted from analog to digital by the A/D conversion unit 14 and 14'. Thus converted from analog to digital, an angular velocity data is inputted into the digital computation unit 15.

The angular velocity data is inputted into the integration circuit 15A and into the low-pass filter unit 15C. In step S.2, the low-pass filter unit 15C performs a low-pass filter (LPF) process, in order to remove a high frequency noise therefrom. The angular velocity data, wherefrom the high frequency noise has been removed, is thereafter inputted into the detection circuit unit 15D.

Figure 11:
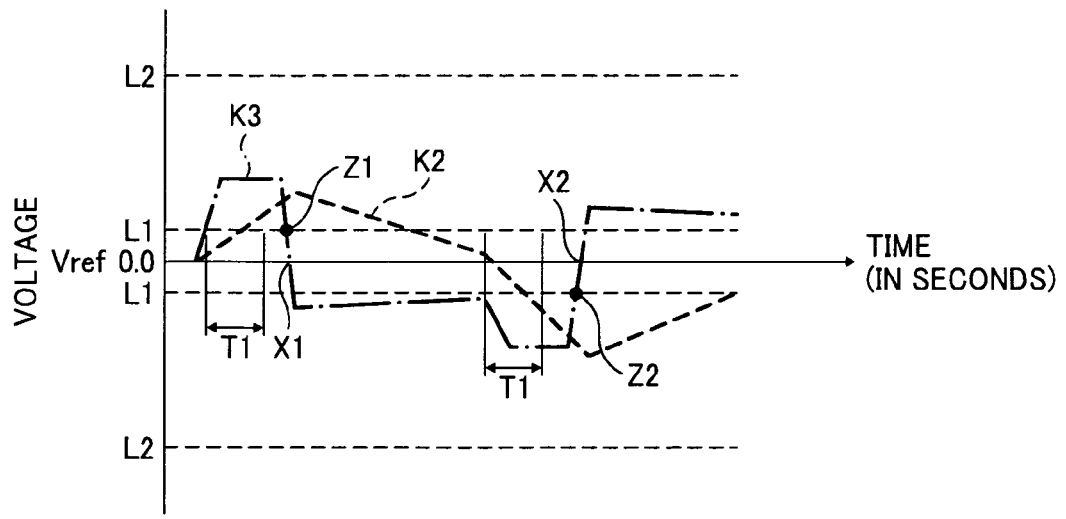
FIG. 11 is a graph that schematically denotes a relation between an angular velocity curve, an angular velocity signal, and a derivative curve, of the imaging device according to the third embodiment of the present invention, and is an enlargement diagram that describes a circumstance wherein an output value that is outputted by the high-pass filter is less than a threshold value.
Figure 12:
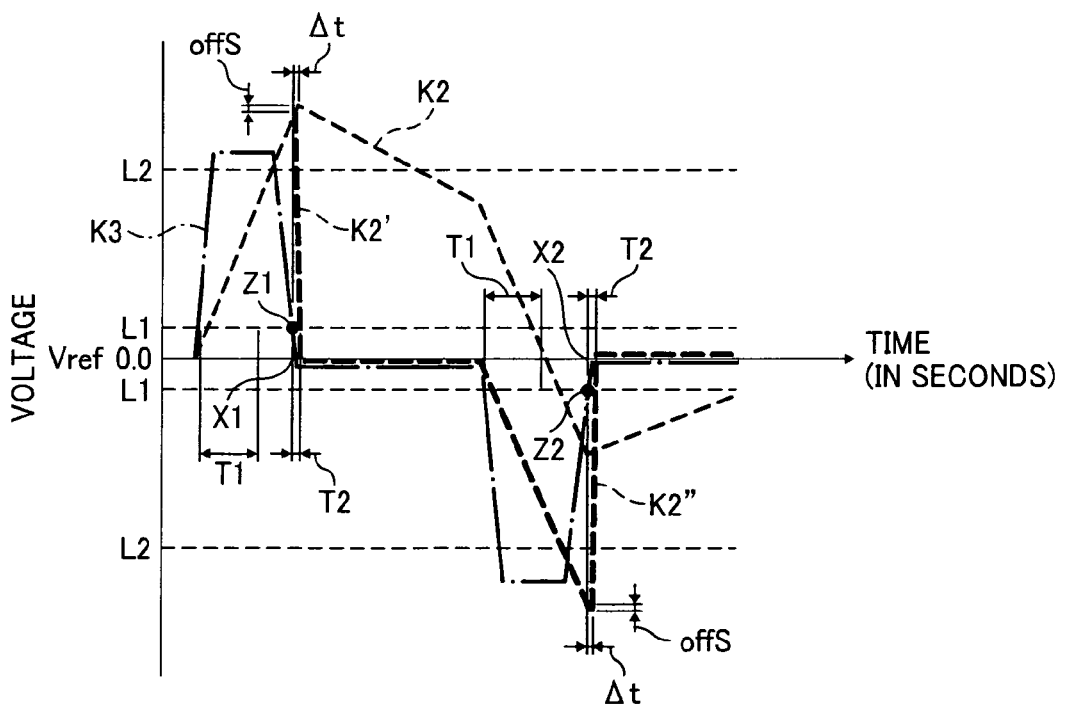
FIG. 12 is a graph that conceptually denotes a relation between an angular velocity curve, an angular velocity signal, and a derivative curve, of the imaging device according to the third embodiment of the present invention, and is an enlargement diagram that describes a circumstance wherein an output value that is outputted by the high-pass filter is greater than a threshold value.

The detection unit 15D1 computes a differential between a value of the angular velocity data at a prior sampling and a value of the angular velocity data at a current sampling, or, put another way, a derivative of the angular velocity signal, i.e., the angular velocity. Concurrently therewith, in step S.3, a determination is made as to whether or not an absolute value of the derivative thereof is greater than the first absolute threshold value L1, such as is depicted in FIG. 11 and FIG. 12. If the absolute value of the derivative thereof is greater than the first absolute threshold value L1, then, in step S.4, the detection unit 15D1 increments the counter therein. Thereafter, the process proceeds to step S.5, wherein a sampling process wait is performed for a prescribed interval, whereupon the process returns to step S.1 and performs the process from step S.1 to step S.3. If the absolute value of the derivative thereof is greater than the absolute threshold value L1, then the process from step S.1 to step S.5 is continued, and a count value of the counter is incremented by one with each iteration thereof.

If the absolute value of the derivative thereof is less than the first absolute threshold value L1, then, in step S.6, the detection unit 15D1 determines whether or not the count value of the counter is greater than the threshold time T1. Put another way, the detection unit 15D1 determines whether or not the absolute value of the derivative thereof is less than or equal to the first absolute threshold value L1 after a contiguous interval wherein the absolute value of the derivative thereof is greater than or equal to the first absolute threshold value L1 has been sustained for an interval that is greater than or equal to the threshold time T1.

If the count value of the counter is less than the threshold time T1 in step S.6, then the process proceeds to step S.11, wherein the counter is reset to zero. Thereafter, the process proceeds to step S.5, wherein the sampling process wait is performed, whereupon the process returns to step S.1 and performs the process beginning in step S.1 once more. The process described herein is a process loop that corresponds to a shaking of the camera body 1 in a circumstance other than taking the pan photograph or the tilt photograph.

If the count value of the counter is greater than the threshold time T1, or, put another way, if the absolute value of the derivative thereof is less than or equal to the first absolute threshold value L1 after the contiguous interval wherein the absolute value of the derivative thereof is greater than or equal to the first absolute threshold value L1 has been sustained for the interval that is greater than or equal to the threshold time T1, then, in step S.6', the detection circuit unit 15D1 determines whether or not a derivative of the output of the angular velocity signal K2 that is outputted from the high-pass filter circuit unit 12 is greater than the second absolute threshold value L2.

If the derivative of the output of the angular velocity signal K2 is less than the second absolute threshold value L2, then the process proceeds to step S.11, wherein the counter is reset to zero. Thereafter, the process proceeds to step S.5, wherein the sampling process wait is performed, whereupon the process returns to step S.1 and performs the process beginning in step S.1 once more. Accordingly, when the count of the counter in greater than the threshold time T1, and the second absolute threshold value L2 is greater than the derivative of the output of the angular velocity signal K2, then the analog switch ASW 1 and ASW 2 is not switched on, the time constant of the high-pass filter HPF 1 and HPF 2 is not changed from the first time constant τ to the second time constant τ', and it is possible to avoid having the detection unit 15D1 mistakenly determine that the pan photograph is being taken when the pan photograph is not being taken.

It is to be understood that in FIG. 11, reference numeral K2 is either an angular velocity signal curve that is outputted by the high-pass filter circuit unit 12, denoted by a dashed line therein, and reference numeral K3 is a derivative curve that is obtained by the derivative process in accordance with the sampling that is described herein, denoted by a single point chain line therein. An x axis thereof denotes a time until the taking of the pan photograph is completed, in seconds, with the time point whereat the taking of the pan photograph commences being treated as zero seconds.

In addition, a y axis thereof is a voltage value, which is dependent upon a sensitivity of the angular velocity sensor 11, and zero thereof corresponds to a reference voltage Vref.

If the absolute value of the derivative of the output of the angular velocity signal K2 is greater than the second absolute threshold value L2, then, in step S.7, the detection unit 15D1 determines to whether or not an exposure is in progress due to an operation of a release button RL that is depicted in FIG. 1. If it is determined that the exposure is in progress, then the process proceeds to step S.11, wherein the counter is reset to zero, skipping a process in step S.8 to S.10 (to be described hereinafter). Thereafter, the process proceeds to step S.5, wherein the sampling process wait is performed, whereupon the process returns to step S.1 and repeats the process beginning in step S.1. Accordingly, during the exposure, with the analog switch ASW 1 and ASW 2 not switched on, in a manner similar to the manner according to the first embodiment, the time constant of the high-pass filter unit HPF 1 and HPF 2 is not changed from the first time constant τ to the second time constant τ', and it is possible thereby to avoid an occurrence of a blurred photographic image that is caused by a rapid change in the angular velocity signal.

If it is determined in step S.7 that the exposure is not in progress, then, in step S.8, the analog switch ASW 1 and ASW 2 is switched on. Switching on the analog switch ASW 1 and ASW 2 causes the charge that is accumulated within the high-pass filter unit HPF 1 and HPF 2 to be rapidly discharged.

Thereafter, the process proceeds to step S.9, wherein a discharge process wait is performed over the interval of the set time interval T2. Thereafter, in step S.10, the analog switch ASW 1 and ASW 2 is switched off. Concurrently therewith, in step S.11, the counter is reset to zero, and the process proceeds to step S.5, returning thereafter to step S.1, whereupon the correction of the movement of the shaking hand is continued.

FIG. 12 illustrates a relation between the angular velocity signal curve K2 and the derivative curve K3, in accordance with an attitudinal change of the camera body 1 when taking the pan photograph when performing the electrical discharge process.

If it is determined that the derivative at the time Z1 (X1), wherein the taking of the pan photograph commences, i.e., wherein the acceleration of the angular velocity is completed, is less than or equal to the first absolute threshold value L1, and that a contiguous time interval wherein the derivative is greater than or equal to the first absolute threshold value L1 has continued for a period that is greater than or equal to the threshold time T1, and if it is determined moreover that the absolute value of the angular velocity signal K2 is greater than the second absolute threshold value L2, and that the exposure is not in progress, then the analog switch ASW 1 and ASW 2 is switched on.

As a consequence thereof, the time constant of the high-pass filter circuit unit 12 is switched from the first time constant τ to the second time constant τ', the charge that is accumulated within the high-pass filter circuit unit 12 is thereby discharged, such as is denoted by reference numeral K2', and the angular velocity signal K2 rapidly decreases and is quickly normalized to Vref. The derivative of the angular velocity signal K2 rapidly increases and decreases in accordance with the rapid decrease of the angular velocity signal K2 (not shown). It is to be understood that the set time interval T2 is set to be greater than the second time constant τ', and thus, the charge that is accumulated within the high-pass filter circuit unit 12 is adequately discharged.

In addition, if it is determined that the derivative at the time Z2 (X2), wherein the taking of the pan photograph is completed, i.e., wherein the deceleration of the angular velocity is completed, is less than or equal to the first absolute threshold value L1, and that a contiguous time interval wherein the derivative is greater than or equal to the first absolute threshold value L1 has continued for a period that is greater than or equal to the threshold time T1, and if it is determined moreover that the absolute value of the angular velocity signal K2 is greater than the second absolute threshold value L2, and that the exposure is not in progress, then the analog switch ASW 1 and ASW 2 is switched on.

As a consequence thereof, the time constant of the high-pass filter circuit unit 12 is switched from the first time constant X to the second time constant τ', the charge that is accumulated within the high-pass filter circuit unit 12 is thereby discharged, such as is denoted by reference numeral K2", and the angular velocity signal K2 rapidly increases and is quickly normalized to Vref. The derivative of the angular velocity signal K2 rapidly increases and decreases in accordance with the rapid increase of the angular velocity signal K2 (not shown). It is to be understood that in the present circumstance, as well as in the previous circumstance, the set time interval T2 is set to be greater than the second time constant τ', and thus, the charge that is accumulated within the high-pass filter circuit unit 12 is adequately discharged.

As is apparent from FIG. 12, setting the absolute threshold value L1 to a small value allows setting the detection timing deviation Δt to a small value, and to set a residual offset voltage "offs" to a small value as well. Accordingly, it is possible to perform a correction of a movement of a shaking hand immediately after taking a tracking shot or a pan photograph, by accurately detecting a commencement of the taking of the pan photograph or a completion of the taking of the pan photograph of the camera body 1, in a manner that is more reliable than is possible according to the first embodiment.

Whereas, according to the third embodiment, it is determined whether or not the exposure is in progress, and it is determined as to whether or not to switch from the first time constant τ, to the second time constant τ', the present invention is not limited thereto.

In addition, it is presumed according to the third embodiment that the change of the time constant of the high-pass filter is prohibited during the exposure process. In addition, it is possible according to the third embodiment to configure the present invention so as to cause the exposure to commence immediately after the set time interval when the request to commence the exposure is received during the set time interval wherein the high-pass filter is set to the second time constant τ'.

According to the imaging device and the image blurring correction device according to present invention, because a change in an angular velocity, which is a change over time of an angular velocity of a camera body, is detected accurately, and a direct current component that is included within an angular velocity signal is removed, it is possible to correct a motion of a shaking hand immediately after taking a tracking photograph or changing an orientation of a camera.

In particular, according to the imaging device according to embodiments, an exposure is made to commence immediately after a set interval, wherein the time constant of the high-pass alter is set to the second time constant, has elapsed, when a request to commence exposure is received thereby during the set interval, thus making it possible to avoid an occurrence of a blurred photographic image that is caused by a rapid change in an angular velocity signal during an exposure process.

According to the imaging device according to one embodiment, an alternating current component that is included within the angular velocity signal is removed, and a change in the angular velocity is detected, thus allowing detecting the change in the angular velocity with an even greater precision than is possible with a conventional technology.

In the imaging device according to another embodiment, changing the time constant during the exposure process is prohibited, thus making it possible to avoid an occurrence of a blurred photographic image that is caused by a rapid change in an angular velocity signal during an exposure process.

In the imaging device and the image blurring correction device according to one embodiment, a determination of either a pan photograph or a tilting photograph is performed that takes a size of the angular velocity signal into account, and thus, it is possible to detect a termination of an acceleration or a deceleration of a camera boy even more accurately than as in the other embodiment, and thereby to perform a correction of a motion of a shaking hand immediately after taking a tracking photograph or a pan photograph in a more reliable manner than as in the other embodiment.

While the description according to the embodiment relates to a configuration that corrects an image blurring by mechanically correcting a misalignment of a position between an image and an imaging element, it is to be understood that the present invention is not restricted thereto, and it would be possible to apply the present invention to a configuration that corrects the image blurring by way of an image process in accordance with a blurring information from an angular velocity sensor as well.

What is claimed is:

1. An imaging device comprising:
   an angular velocity sensor configured to detect a shaking of a camera body having an imaging unit and to output a blurring signal corresponding to the detected shaking;
   a high-pass filter including a time constant that can be set to a first time constant or a second time constant, which is less than the first time constant, said high-pass filter being configured to eliminate a direct current component that is included within the blurring signal in accordance with the first time constant, and to output a fluctuation portion of the blurring signal with respect to a reference voltage as an angular velocity signal;
   an analog switch configured to cause a charge that is accumulated within the high-pass filter to discharge according to the second time constant;
   a computation unit configured to receive the angular velocity signal, and to perform a computation to correct a blurring of an image imaged by the imaging unit in accordance with the angular velocity signal;
   a detection unit configured, in order to detect a change of the angular velocity of the camera body, to sample the angular velocity signal at predetermined times, to obtain a derivative value in accordance with a sampled value of the angular velocity signal, and to detect a time change in the obtained derivative value, the detection unit having a predetermined absolute threshold value; and
   a switching unit configured to switch the time constant of the high-pass filter between the first time constant and the second time constant switching the analog switch on or off in accordance with a detection result of the detection unit;
   wherein:
   the detection unit comprises a determination unit configured to compute a duration time from a time when an absolute value of the derivative value is greater than or equal to the absolute threshold value to a time when the absolute value of the derivative value is less than the absolute threshold value, and to determine whether or not the duration time is greater than a predetermined threshold time; and
   the switching unit is configured to switch the analog switch on, to cause the charge that is accumulated within the high-pass filter to discharge according to the second time constant, when the determination unit determines that the absolute value of the derivative value is less than the absolute threshold value, and that the duration time is greater than the predetermined threshold time interval.

2. The imaging device according to claim 1, wherein the switching unit is configured to restore the time constant of the high-pass filter to the first time constant within a set period that is shorter than the first time constant and longer than the second time constant, after switching the time constant of the high-pass filter to the second time constant.

3. The imaging device according to claim 2, wherein the computation unit causes an exposure of the imaging unit's image to commence immediately after the set period wherein the time constant of the high-pass filter is set to the second time constant has elapsed, when a request to commence exposure is received in the set period.

4. The imaging device according to claim 1, wherein the computation unit comprises a low-pass filter part configured to remove a fluctuating component that is included within the angular velocity signal, and which is located in a forepart of the detection unit.

5. The imaging device according to claim 1, wherein the computation unit is configured to prohibit changing the time constant of the high-pass filter during an exposure of the image.

6. The imaging device according to claim 1, wherein the switching unit is configured to restore the time constant of the high-pass filter to the first time constant within a set period that is shorter than the first time constant and longer than the second time constant, after switching the time constant of the high-pass filter to the second time constant.

7. The imaging device according to claim 6, wherein the computation unit is configured to prohibit changing the time constant of the high-pass filter during the exposure.

8. The imaging device according to claim 6, wherein the computation unit causes the exposure to commence immediately after the set period wherein the time constant of the high-pass filter is set to the second time constant has elapsed, when a request to commence the exposure is received during the set period.

9. An imaging device comprising:
an angular velocity sensor configured to detect a shaking of a camera body having an imaging unit and to output a blurring signal corresponding to the detected shaking;
a high-pass filter including a time constant that can be set to a first time constant or a second time constant, which is less than the first time constant, said high-pass filter being configured to receive an input of the blurring signal, to eliminate a direct current component that is included within the blurring signal in accordance with the first time constant, and to output a fluctuation portion of the blurring signal with respect to a reference voltage as an angular velocity signal;
an analog switch configured to cause a charge that is accumulated within the high-pass filter to discharge according to the second time constant;
a computation unit configured to receive the angular velocity signal, and to perform a computation to correct a blurring of an image imaged by the imaging unit in accordance with the angular velocity signal;
a detection unit configured to detect a time when a change of an orientation of the camera body commences and a time when a change of an orientation of the camera body terminates, by detecting a change over time of the angular velocity of the camera body; and
a switching unit configured to switch the time constant of the high-pass filter from the first time constant to the second time constant, and to restore the time constant to the first time constant, by switching the analog switch on or off when the detection unit detects either the time when the change of the orientation of the camera body commences or the time when the change of the orientation of the camera body terminates,
wherein the switching unit is configured to switch the time constant from the first time constant to the second time constant and to discharge the charge that is accumulated within the high-pass filter, each time the detection unit detects that the change of the orientation of the camera body commences and the change of the orientation of the camera body terminates.

10. The imaging device according to claim 9, wherein the computation unit causes an exposure of the imaging unit's image to commence immediately after a set period wherein the time constant of the high-pass filter is set to the second time constant has elapsed, when a request to commence exposure of the image is received during the set period.

11. The imaging device according to claim 10, wherein the computation unit is configured to prohibit changing the time constant of the high-pass filter during the exposure.

12. An image blurring correction device comprising:
an angular velocity sensor configured to detect a shaking of a camera body having an imaging unit and to output a blurring signal corresponding to the detected shaking;
a high-pass filter including a time constant that can be set to a first time constant or a second time constant, which is less than the first time constant, said high-pass filter being configured to receive an input of the blurring signal, to eliminate a direct current component that is included within the blurring signal in accordance with the first time constant, and to output a fluctuation portion of the blurring signal with respect to a reference voltage as an angular velocity signal;
an analog switch configured to cause a charge that is accumulated within the high-pass filter to discharge according to the second time constant;
a computation unit configured to receive the angular velocity signal, and to perform a computation to correct a blurring of an image imaged on the imaging unit in accordance with the angular velocity signal;
a detection unit configured to detect whether or not an exposure of the image on the imaging unit is performed; and
a switching unit configured to switch the time constant of the high-pass filter between the first time constant and the second time constant by switching the analog switch on or off in accordance with a detection result of the detection unit,
wherein the switching unit is configured to switch the time constant of the high-pass filter from the first time constant to the second time constant, and to discharge the charge that is accumulated within the high-pass filter, when the detection unit detects that the exposure is not performed.

13. The image blurring correction device according to claim 12, wherein
the switching unit is configured to switch the time constant of the high-pass filter from the first time constant to the second time constant, and to restore the time constant to the first time constant, by switching the analog switch on or off when the detection unit detects either commencement of change of an orientation of the camera body or termination of the change of the orientation of the camera body.

* * * * *